(12) United States Patent
Coady et al.

(10) Patent No.: US 11,295,227 B2
(45) Date of Patent: Apr. 5, 2022

(54) QUBIT VALUE CHANGE MONITOR

(71) Applicant: Red Hat, Inc., Raleigh, NC (US)

(72) Inventors: Stephen Coady, Waterford (IE); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/886,236

(22) Filed: May 28, 2020

(65) Prior Publication Data

US 2021/0374584 A1   Dec. 2, 2021

(51) Int. Cl.
*G06N 10/00*   (2019.01)
*G06F 8/30*   (2018.01)

(52) U.S. Cl.
CPC ............. *G06N 10/00* (2019.01); *G06F 8/311* (2013.01)

(58) Field of Classification Search
CPC ................................ G06N 10/00; G06F 8/311
See application file for complete search history.

(56) References Cited

U.S. PATENT DOCUMENTS

| | | | | |
|---|---|---|---|---|
| 9,870,277 | B2 * | 1/2018 | Berkley | G06N 10/00 |
| 10,872,021 | B1 * | 12/2020 | Tezak | G06N 10/00 |
| 2002/0117738 | A1 * | 8/2002 | Amin | G06N 10/00 257/663 |
| 2006/0151775 | A1 * | 7/2006 | Hollenberg | G06N 10/00 257/14 |
| 2012/0023053 | A1 * | 1/2012 | Harris | B82Y 10/00 706/45 |
| 2013/0278283 | A1 * | 10/2013 | Berkley | G06N 10/00 326/5 |
| 2015/0254571 | A1 * | 9/2015 | Miller | G11C 11/44 326/3 |
| 2016/0006519 | A1 * | 1/2016 | Lail | H04B 10/90 455/899 |
| 2016/0085616 | A1 * | 3/2016 | Berkley | G06F 11/0724 714/746 |
| 2016/0112066 | A1 * | 4/2016 | Ashikhmin | H03M 13/1575 714/785 |
| 2019/0065299 | A1 * | 2/2019 | Lee | G06F 11/0706 |
| 2019/0302107 | A1 * | 10/2019 | Kauffman | G16C 20/50 |
| 2020/0174879 | A1 * | 6/2020 | Javadiabhari | G06F 11/0721 |
| 2020/0311220 | A1 * | 10/2020 | Gunnels | G06F 30/30 |
| 2020/0342345 | A1 * | 10/2020 | Farhi | G06N 3/082 |

OTHER PUBLICATIONS

Han et al., "Quantum-Inspired Evolutionary Algorithm for a Class of Combinatorial Optimization" (Year: 2002).*

(Continued)

*Primary Examiner* — Phillip H Nguyen

(74) *Attorney, Agent, or Firm* — Withrow & Terranova, PLLC

(57) ABSTRACT

A qubit value change monitor is disclosed. An initial qubit value of a qubit in superposition is determined based on a first plurality of readings of the qubit. Subsequent to determining the initial qubit value, a current first qubit value is determined based on a second plurality of readings of the qubit. It is determined that the initial first qubit value differs from the current first qubit value. Responsive to determining that the initial first qubit value differs from the current first qubit value, a changed qubit action is initiated.

20 Claims, 9 Drawing Sheets

(56) References Cited

OTHER PUBLICATIONS

Dressel, Justin, et al., "Arrow of Time for Continuous Quantum Measurement," https://arxiv.org/pdf/1610.03818v1.pdf, Oct. 13, 2016, 7 pages.

Gershon, Eric, "New qubit control bodes well for future of quantum computing," Yale University, https://phys.org/news/2013-01-qubit-bodes-future-quantum.html, Jan. 14, 2013, 3 pages.

Guhne, Otfried, et al., "Entanglement detection," Preprint submitted to Elsevier, Physics Reports, vol. 474, Apr. 2009, 90 pages.

Pathumsoot, Poramet, et al., "Modeling of Measurement-based Quantum Network Coding on IBM Q ExperienceDevices," https://arxiv.org/pdf/1910.00815.pdf, Nov. 12, 2019, 10 pages.

* cited by examiner

QUBIT VALUE CHANGE MONITOR

BACKGROUND

Quantum computing utilizes qubits to perform quantum calculations. A qubit in superposition may have a value of any proportion of both zero and one at the same time. Reading a qubit in superposition will result in a value of zero or a value of one.

SUMMARY

The examples disclosed herein implement a qubit value change monitor that detects a change of a value of a qubit in superposition and, in response, initiates a changed qubit action.

In one example, a method is provided. The method includes determining, based on a first plurality of readings of a first qubit that is in superposition, an initial first qubit value. The method further includes subsequent to determining the initial first qubit value, determining, based on a second plurality of readings of the first qubit that is in superposition, a current first qubit value. The method further includes determining that the initial first qubit value differs from the current first qubit value. The method further includes, responsive to determining that the initial first qubit value differs from the current first qubit value, initiating a changed qubit action.

In another example, another method is disclosed. The method includes determining, for each of a first plurality of iterations, a value of a first qubit in superposition to generate a set of values. The method further includes determining, based on the set of values, an initial first qubit value. The method further includes, subsequent to determining the initial first qubit value, determining, for each of a second plurality of iterations, the value of the first qubit in superposition to generate a second set of values. The method further includes determining, based on the second set of values, a current first qubit value. The method further includes determining that the initial first qubit value differs from the current first qubit value and, responsive to determining that the initial first qubit value differs from the current first qubit value, initiating a changed qubit action.

In another example, a quantum computing system is disclosed. The quantum computing system includes a memory and a processor device coupled to the memory. The processor device is to determine an initial first qubit value of a first qubit that is in superposition. The processor device is further to, subsequent to determining the initial first qubit value, determine, based on a plurality of readings of the first qubit that is in superposition, a current first qubit value. The processor device is further to determine that the initial first qubit value differs from the current first qubit value and, responsive to determining that the initial first qubit value differs from the current first qubit value, initiate a changed qubit action.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing utilizes qubits to perform quantum calculations. A qubit in superposition may have a value of any proportion of both zero and one at the same time. A qubit in superposition has a probability of having a value of 1 and a probability of having a value of 0. Reading a qubit in superposition will result in either a value of zero or a value of one, but reading the same qubit iteratively will sometimes result in a value of one and sometimes a value of zero. This probabilistic nature of the value of a qubit in superposition makes it difficult, or impractical, to be able to determine when a value of a qubit in superposition changes.

The examples disclosed herein implement a qubit value change monitor that detects a change in a value of a qubit in superposition and, in response, initiates a changed qubit action. The qubit value change monitor determines an initial qubit value of a qubit based on a plurality of readings of the qubit. The qubit value change monitor then subsequently determines a current qubit value of the qubit based on an additional plurality of readings of the qubit. Upon determining that the current qubit value differs from the initial qubit value, the qubit value change monitor initiates a changed qubit action. In this manner, a desired automated action can be triggered based on the change in value of one or more qubits.

Figure 1:
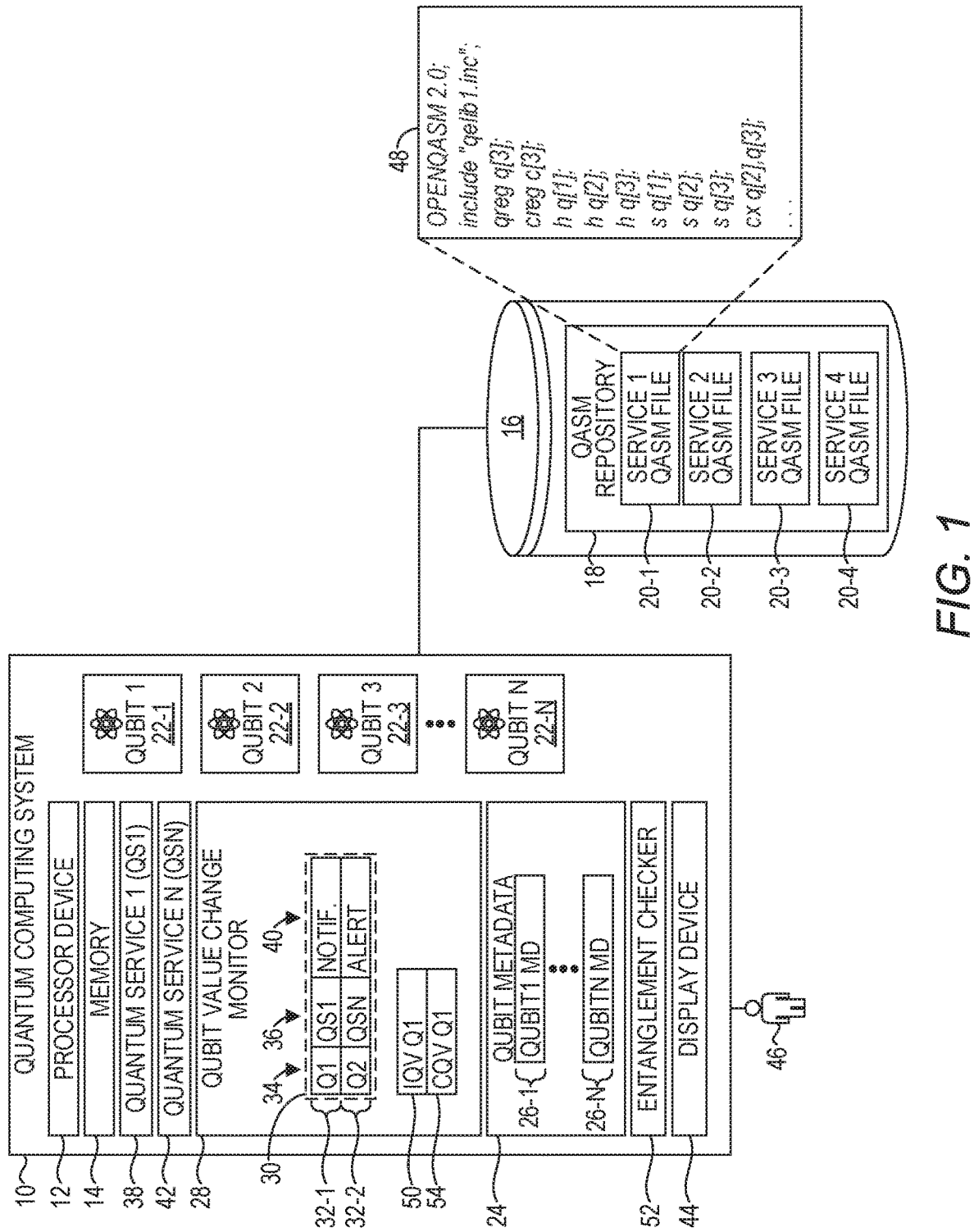
FIG. 1 is a block diagram of a quantum computing system in which examples may be practiced.

FIG. 1 is a block diagram of a quantum computing system 10 in which examples may be practiced. The quantum computing system 10 operates in a quantum environment but can operate using classical computing principles or quantum computing principles. When using quantum computing principles, the quantum computing system 10 performs computations that utilize quantum-mechanical phenomena, such as superposition and entanglement. The quantum computing system 10 may operate under certain environmental conditions, such as at or near 0° Kelvin. When using classical computing principles, the quantum computing system 10 utilizes binary digits that have a value of either 1 or 0.

The quantum computing system 10 includes one or more processor devices 12 and a memory 14. The quantum computing system 10 is communicatively coupled to a storage device 16 on which a quantum assembly (QASM) repository 18 is stored. The QASM repository 18 includes a plurality of QASM files 20-1-20-4, discussed in greater detail below.

The quantum computing system 10 implements a plurality of qubits 22-1-22-N. The quantum computing system 10 is capable of initiating a plurality of different quantum services. The term "quantum service" as used herein refers to a quantum application that accesses one or more of the qubits 22-1-22-N and provides some desired functionality. Each quantum service is implemented via a corresponding QASM file 20-1-20-4, each of which comprises quantum computing instructions. In this example, the QASM file 20-1 corresponds to a quantum service 1; the QASM file 20-2 corresponds to a quantum service 2; the QASM file 20-3 corresponds to a quantum service 3; and the QASM file 20-4 corresponds to a quantum service 4. This correspondence information may be stored and accessible to components of the quantum computing system 10.

The quantum computing system 10 may also maintain qubit metadata 24, which comprises a plurality of metadata records 26-1-26-N, each of which maintains information about a corresponding qubit 22-1-22-N, such as, by way of non-limiting example, an identifier of the corresponding qubit 22-1-22-N, a quantum service identifier of the quantum service currently using the corresponding qubit 22-1-22-N, whether the corresponding qubit 22-1-22-N is currently entangled, or the like.

The quantum computing system 10 implements a qubit value change monitor 28 that operates to, upon request, detect changes of the values of the qubits 22-1-22-N. The qubit value change monitor 28 maintains a watch structure 30 that contains an entry for each qubit being monitored by the qubit value change monitor 28. An entry 32-1 contains a quantum identifier field 34 that identifies the qubit being monitored, or watched. The quantum identifier field 34 of the entry 32-1 indicates that the qubit 22-1 (Qubit 1) is being monitored. A quantum service identifier field 36 of the entry 32-1 indicates that a quantum service 38 (QS1) has requested notification of a change in value of the qubit 22-1. A qubit action field 40 indicates that the qubit value change monitor 28 is to send the quantum service 38 a notification upon detecting that the value of the qubit 22-1 has changed.

An entry 32-2 contains a quantum identifier field 34 that identifies the qubit 22-2 (Qubit 2) as being monitored. The quantum service identifier field 36 of the entry 32-2 indicates that a quantum service 42 (QSN) has requested notification of a change in value of the qubit 22-2. The qubit action field 40 indicates that the qubit value change monitor 28 is to send an alert, such as to a display device 44 for presentation to an operator 46.

The entries 32-1-32-2 may be generated, for example, in response to commands from the operator 46 via a suitable user interface. The entries 32-1-32-2 may also be generated via requests from the quantum services 38 and 42, respectively. For example, the quantum services 38 and 42 may request, via a suitable inter-process communications mechanism, such as an application programming interface (API), or the like, the qubit value change monitor 28 to monitor a specified qubit 22-1-22-N for a change in value. For example, the quantum service 38 may invoke a "Watch Qubit" function of the qubit value change monitor 28 to request that the qubit 22-1 be monitored for a change in value. The quantum service 38 may include in the request the identifier of the qubit 22-1 and that the quantum service 38 be notified upon a change in the value of the qubit 22-1. In response, the qubit value change monitor 28 generates the entry 32-1.

For purposes of illustrating the operation of the qubit value change monitor 28 according to one implementation, assume that the quantum service 38 is initiated by executing the QASM file 20-1 (note that the programming instructions illustrated in inset 48 of the QASM file 20-1 are merely exemplary, and are not sufficient to implement the functionality described herein with regard to the quantum service 38). At some point during execution, the quantum service 38 sends a request to the qubit value change monitor 28 to be notified upon a change in value of the qubit 22-1. The qubit value change monitor 28 receives the request and generates the entry 32-1. The qubit value change monitor 28 inserts a qubit identifier that identifies the qubit 22-1 into the quantum identifier field 34 of the entry 32-1. The qubit value change monitor 28 inserts an identifier of the quantum service 38 into the quantum service identifier field 36 of the entry 32-1. The identifier of the quantum service 38 may comprise, for example, an IP address of the quantum service 38, a channel identifier of a channel that is monitored by the quantum service 38, or any other information that allows the qubit value change monitor 28 to communicate with the quantum service 38.

The qubit value change monitor 28 then determines an initial qubit value (IQV) 50 of the qubit 22-1. In some implementations, the qubit value change monitor 28 may first, prior to determining the IQV 50, ensure that the qubit 22-1 is not entangled. In some implementations, the quantum computing system 10 includes an entanglement checker 52 that operates, upon request, to determine whether one or more of the qubits 22 are in an entangled state. The entanglement checker 52 receives a request to determine whether the qubit 22-1 is entangled. The entanglement checker 52 may access information, such as the metadata record 26-1, and determine that the qubit 22-1 is manipulated by one or more QASM files 20-1-20-4. The entanglement checker 52 may then access the QASM file(s) 20-1-20-4 that manipulate the qubit 22-1, and parse the respective QASM files 20 in accordance with a QASM programming language syntax. If the entanglement checker 52 identifies programming instructions that, when executed, cause the qubit 22-1 to enter the entangled state, the entanglement checker 52 may then access information to determine whether or not the quantum service or quantum services that correspond to such QASM file(s) 20-1-20-4 are actually executing. If so, the entanglement checker 52 may indicate that the qubit 22-1 is currently entangled and cannot be read. If not, the entanglement checker 52 indicates that the qubit 22-1 is not currently entangled, and can thus be read.

If the qubit value change monitor 28 determines that the qubit 22-1 is not entangled, the qubit value change monitor 28 may then determine if the qubit 22-1 is in superposition. In one implementation, the qubit value change monitor 28 may access the QASM file 20-1 and parse the QASM file 20-1 in accordance with a QASM programming language syntax to determine if the QASM file 20-1 contains instructions that put the qubit 22-1 into superposition. If not, the qubit value change monitor 28 may simply read the qubit 22-1 to determine the IQV 50.

If the qubit 22-1 is in superposition, the qubit value change monitor 28 initiates an iterative process that involves a plurality of readings of the qubit 22-1 to determine the IQV 50. Additional details of the iterative process to determine the IQV 50 are discussed with regard to FIG. 3, below. The qubit value change monitor 28 may then, subsequently, initiate the same iterative process that involves a plurality of readings of the qubit 22-1 to determine a current qubit value (CQV) 54. The qubit value change monitor 28 then compares the CQV 54 to the IQV 50. If the CQV 54 is the same as the IQV 50, then the quantum service 38 is not notified. If the CQV 54 is not the same as the IQV 50, then the qubit value change monitor 28 notifies the quantum service 38, such as by sending the quantum service 38 a message, that the value of the qubit 22-1 has changed.

If the CQV 54 is the same as the IQV 50, the qubit value change monitor 28 continuously initiates the iterative process that involves a plurality of readings of the qubit 22-1 to determine a new CQV 54. This iterative process may be repeated intermittently, aperiodically, or periodically at any suitable interval, such as, by way of non-limiting example, every 100 milliseconds, every 250 milliseconds, every 500 milliseconds, every second, every five seconds, or any other desirable interval.

In some implementations, a requestor may identify a plurality of qubits 22-1-22-N in a request to the qubit value change monitor 28, and request that the qubit value change monitor 28 send a notification to the requestor if any of the identified plurality of qubits 22-1-22-N have changed.

It is further noted that, because the qubit value change monitor 28 is a component of the quantum computing system 10, functionality implemented by the qubit value change monitor 28 may be attributed to the quantum computing system 10 generally. Moreover, in examples where the qubit value change monitor 28 comprises software instructions that program the processor device 12 to carry out functionality discussed herein, functionality implemented by the qubit value change monitor 28 may be attributed herein to the processor device 12.

Figure 2:
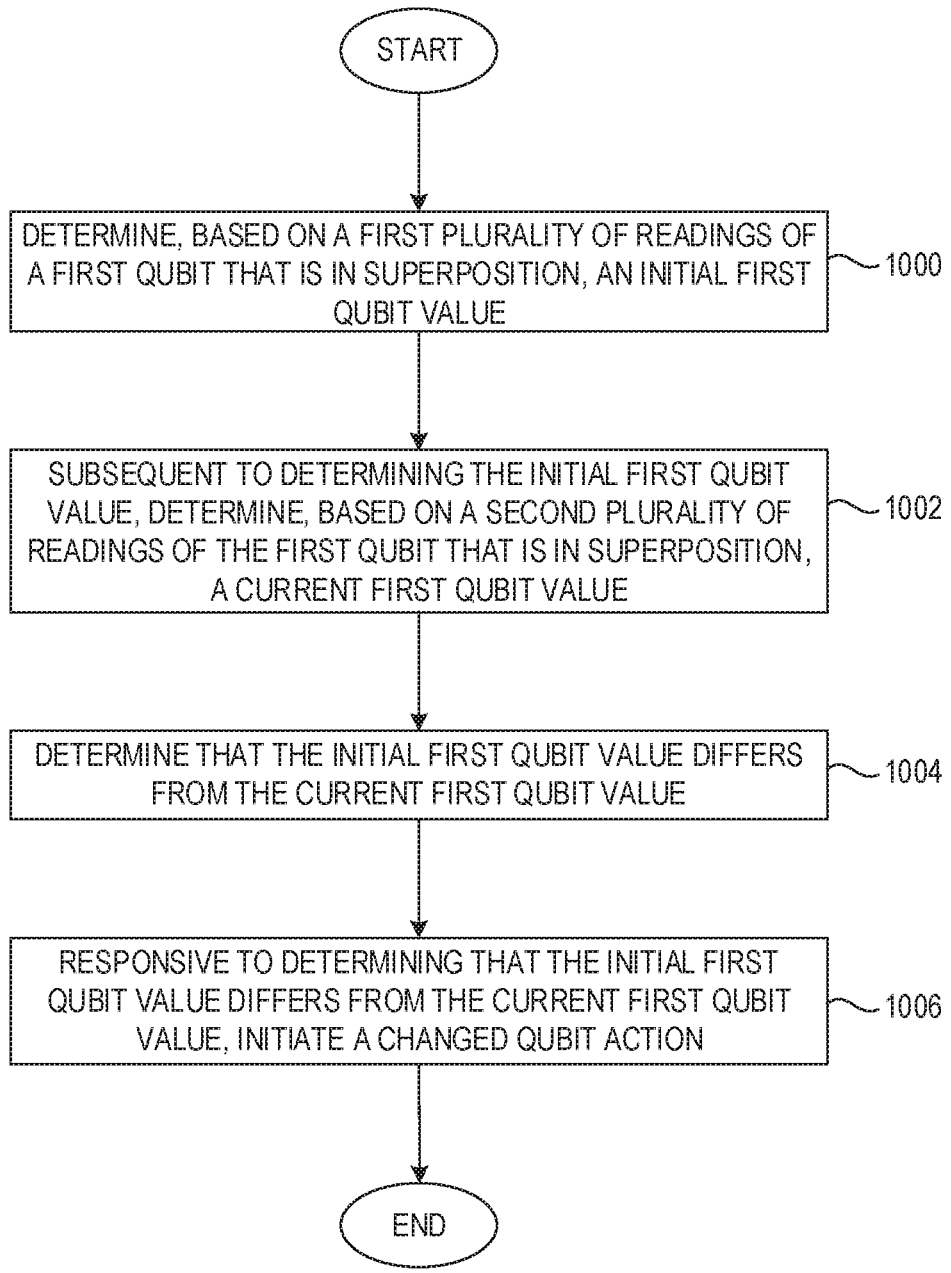
FIG. 2 is a flowchart of a method for a qubit value change monitor to determine whether a value of a qubit has changed, according to one example.

FIG. 2 is a flowchart of a method for the qubit value change monitor 28 to determine whether a value of a qubit 22 has changed according to one example. FIG. 2 will be discussed in conjunction with FIG. 1. The qubit value change monitor 28 determines, based on a first plurality of readings of the qubit 22-1 that is in superposition, the IQV 50 (FIG. 2, block 1000). Subsequent to determining the IQV 50, the qubit value change monitor 28 determines, based on a second plurality of readings of the qubit 22-1 that is in superposition, the CQV 54 (FIG. 2, block 1002). The qubit value change monitor 28 determines that the initial qubit value 50 differs from the CQV 54 (FIG. 2, block 1004). Responsive to determining that the IQV 50 differs from the CQV 54, the qubit value change monitor 28 initiates a changed qubit action (FIG. 2, block 1006).

Figure 3:
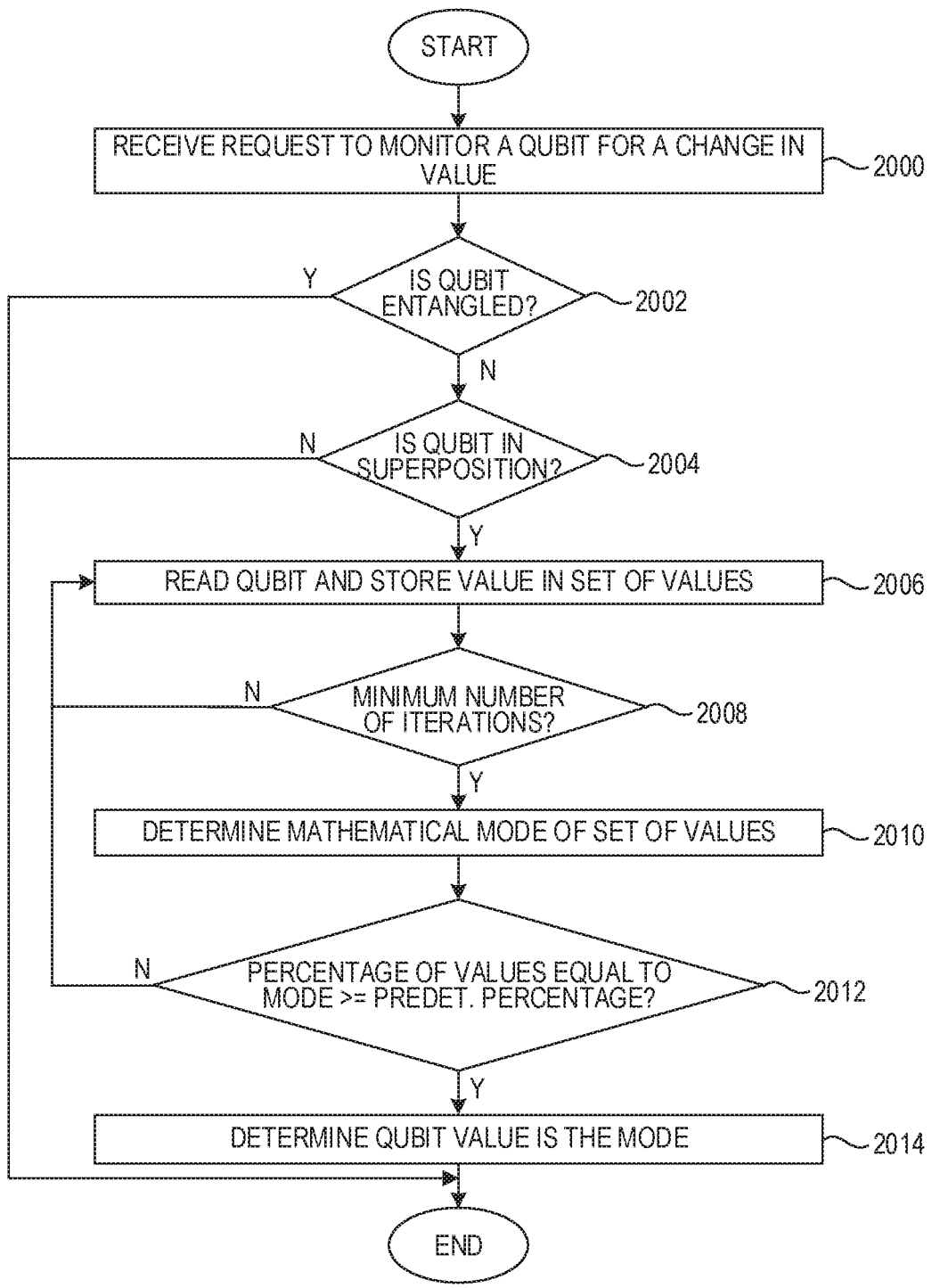
FIG. 3 is a flowchart of a method of a qubit value determination operation suitable for determining an initial qubit value of a qubit in superposition, or a subsequent current qubit value, according to one implementation.

FIG. 3 is a flowchart of a method of a qubit value determination operation suitable for determining an initial qubit value of a qubit in superposition, or a subsequent current qubit value, according to one implementation. FIG. 3 will be discussed in conjunction with FIG. 1. The qubit value change monitor 28 receives a request from the quantum service 38 to monitor the qubit 22-1 for a change in value (FIG. 3, step 2000). The qubit value change monitor 28 may first request that the entanglement checker 52 determine whether the qubit 22-1 is entangled (FIG. 3, step 2002). If so, the qubit value change monitor 28 stops the qubit value determination operation and sends the quantum service 38 a suitable message. If the qubit 22-1 is not entangled, the qubit value change monitor 28 determines whether or not the qubit 22-1 is in superposition (FIG. 3, step 2004). If not, the qubit value change monitor 28 can simply read the qubit 22-1 to obtain the IQV 50, and can subsequently obtain the current qubit value 54 by simply reading the qubit 22-1.

If the qubit 22-1 is in superposition, the qubit value change monitor 28 starts an iterative process to obtain a plurality of readings of the qubit 22-1. In particular, the qubit value change monitor 28 reads the qubit 22-1 and stores the value, a zero or a one, in a set of values (FIG. 3, step 2006). The qubit value change monitor 28 determines if one or more conditions have been met. If not, the qubit value change monitor 28 repeats the process. In this example, the condition is based on both a minimum number of readings of the qubit 22-1 (FIG. 3, step 2008), and a predetermined percentage of the values of the qubit in the set of values having a same value—i.e., that at least a predetermined percentage of the values are one or zero (FIG. 3, step 2012, discussed below). The minimum number of iterations, for example, may be ten iterations, one hundred iterations, 500 iterations, or any other suitable number.

The qubit value change monitor 28 thus iteratively reads the value of the qubit 22-1 and adds the value to the set of values for a number of times equal to the minimum number of iterations (FIG. 3, steps 2006, 2008). After the qubit value change monitor 28 has read the qubit 22-1 a number of times equal to the minimum number of iterations, the qubit value change monitor 28 determines the mathematical mode of the set of values (FIG. 3, step 2010). The qubit value change monitor 28 then determines whether the percentage of values in the set of values that have a value equal to the mode are greater than or equal to the predetermined percentage (FIG. 3, step 2012). The predetermined percentage may comprise any suitable percentage, such as 60, 70, 75, 80, 85, 90, 95, 99 percent, or the like.

If the percentage of values in the set of values have a value equal to the mode greater than or equal to the predetermined percentage, the qubit value change monitor 28 determines that the value of the qubit 22-1 is the mode (FIG. 3, step 2014). If the percentage of values in the set of values having a value equal to the mode are not greater than or equal to the predetermined percentage, the qubit value change monitor 28 repeats the steps 2006-2012 until the percentage of values in the set of values having a value equal to the mode are greater than or equal to the predetermined percentage. Note that this qubit value determination process may be utilized to determine both the IQV 50 and the subsequent CQVs 54 of the qubit 22-1. Note further that the qubit value determination process may be performed as rapidly as the quantum computing system 10 can read the value of the qubit 22-1, and thus the qubit value determination process may take less than, for example, one millisecond.

Figure 4:
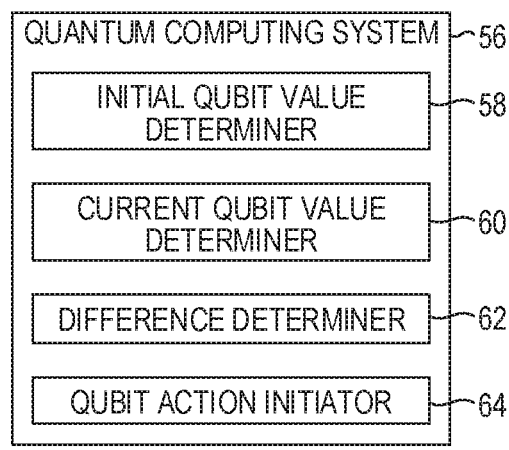
FIG. 4 is a block diagram of a quantum computing system according to another implementation.

FIG. 4 is a block diagram of a quantum computing system 56 according to another implementation. The quantum computing system 56 implements identical functionality as that described above with regard to the quantum computing system 10. The quantum computing system 56 includes an initial qubit value determiner 58 to determine, based on a first plurality of readings of a first qubit that is in superposition, an initial first qubit value. The initial qubit value determiner 58 may be implemented via, for example, the qubit value determination operation illustrated in FIG. 3. The initial qubit value determiner 58 may comprise executable software instructions configured to program a processor device to implement the functionality of determining, based on a first plurality of readings of a first qubit that is in superposition, an initial first qubit value, may comprise circuitry including, by way of non-limiting example, an application-specific integrated circuit (ASIC) or a field-programmable gate array (FPGA), or may comprise a combination of executable software instructions and circuitry.

The quantum computing system 56 includes a current qubit value determiner 60 to, subsequent to determining the initial first qubit value, determine, based on a second plurality of readings of the first qubit that is in superposition, a current first qubit value. The current qubit value determiner 60 may be implemented via, for example, the qubit value determination operation illustrated in FIG. 3. The current qubit value determiner 60 may comprise executable software instructions configured to program a processor device to implement the functionality of determining, based on a second plurality of readings of the first qubit that is in superposition, a current first qubit value, may comprise circuitry including, by way of non-limiting example, an application-specific integrated circuit (ASIC) or a field-programmable gate array (FPGA), or may comprise a combination of executable software instructions and circuitry.

The quantum computing system 56 includes a difference determiner 62 to determine that the initial first qubit value differs from the current first qubit value. The difference determiner 62 may comprise executable software instructions configured to program a processor device to implement the functionality of determining that the initial first qubit value differs from the current first qubit value, may comprise circuitry including, by way of non-limiting example, an application-specific integrated circuit (ASIC) or a field-programmable gate array (FPGA), or may comprise a combination of executable software instructions and circuitry.

The quantum computing system 56 further includes a qubit action initiator 64 to, responsive to determining that the initial first qubit value differs from the current first qubit value, initiate a changed qubit action. The qubit action initiator 64 may comprise executable software instructions configured to program a processor device to implement the functionality of, responsive to determining that the initial first qubit value differs from the current first qubit value, initiating a changed qubit action, may comprise circuitry including, by way of non-limiting example, an application-specific integrated circuit (ASIC) or a field-programmable gate array (FPGA), or may comprise a combination of executable software instructions and circuitry.

Figure 5:
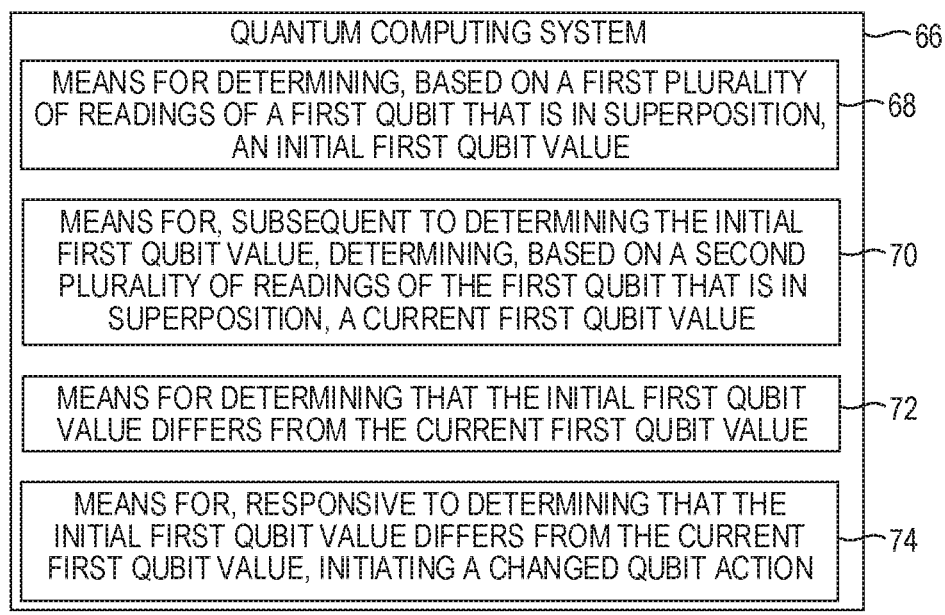
FIG. 5 is a block diagram of a quantum computing system according to another implementation.

FIG. 5 is a block diagram of a quantum computing system 66 according to additional implementations. The quantum computing system 66 implements identical functionality as that described above with regard to the quantum computing systems 10 and 56. In this implementation, the quantum computing system 66 includes a means 68 for determining, based on a first plurality of readings of a first qubit that is in superposition, an initial first qubit value. The means 68 may be implemented in any number of manners, including, for example, via the initial qubit value determiner 58 illustrated in FIG. 4.

The quantum computing system 66 also includes a means 70 for, subsequent to determining the initial first qubit value, determining, based on a second plurality of readings of the first qubit that is in superposition, a current first qubit value. The means 70 may be implemented in any number of manners, including, for example, via the current qubit value determiner 60 illustrated in FIG. 4.

The quantum computing system 66 also includes a means 72 for determining that the initial first qubit value differs from the current first qubit value. The means 72 may be implemented in any number of manners, including, for example, via the difference determiner 62 illustrated in FIG. 4.

The quantum computing system 66 also includes a means 74 for, responsive to determining that the initial first qubit value differs from the current first qubit value, initiating a changed qubit action. The means 74 may be implemented in any number of manners, including, for example, via the qubit action initiator 64 illustrated in FIG. 4.

Figure 6:
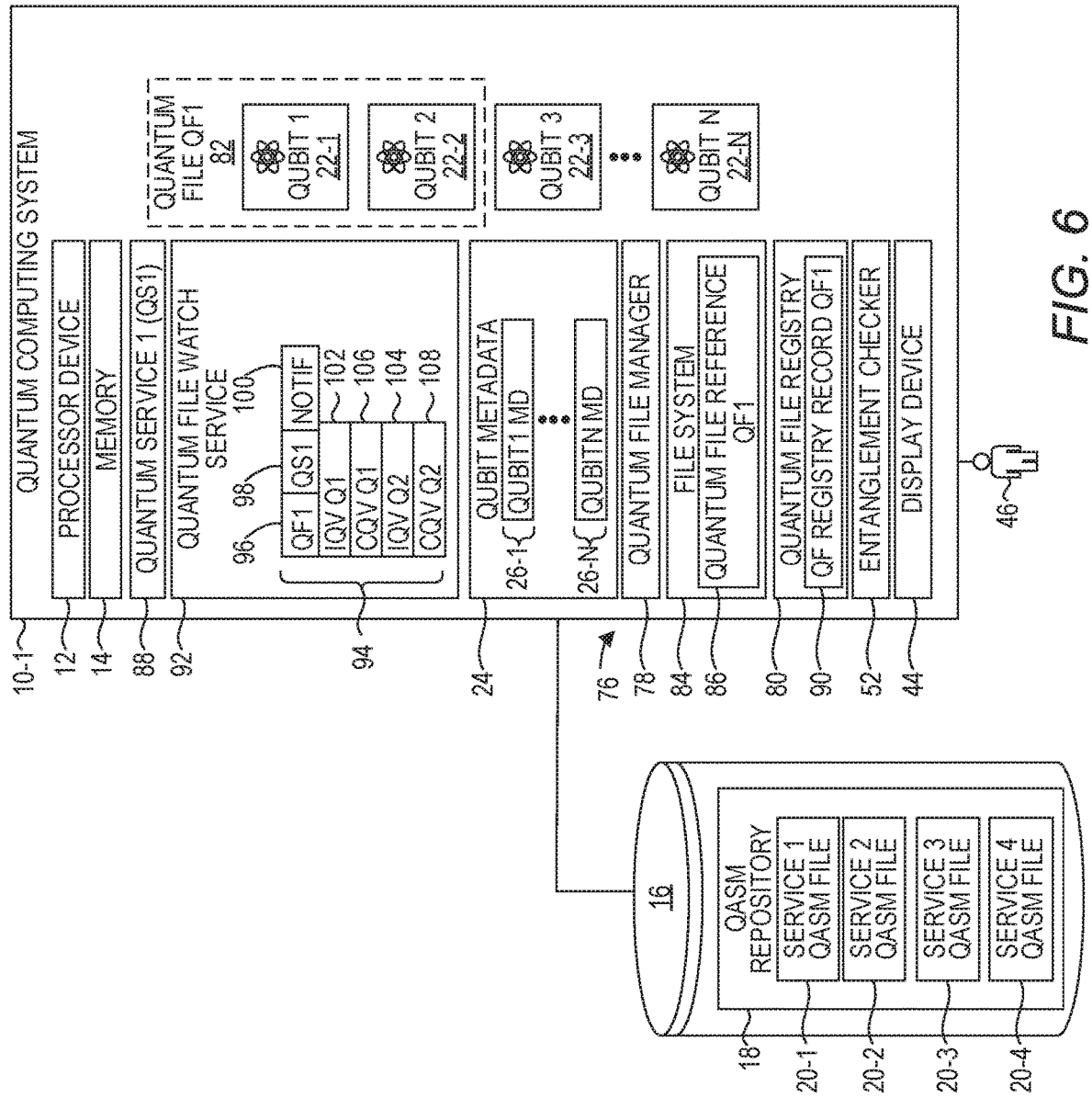
FIG. 6 is a block diagram of a quantum computing system that implements a quantum file watch service, according to one implementation.

FIG. 6 is a block diagram of a quantum computing system 10-1 according to another implementation. The quantum computing system 10-1 is similar to the quantum computing system 10, and like components are numbered the same as in FIG. 1 and will not be discussed with respect to FIG. 6. The quantum computing system 10-1 implements a quantum file management system 76. The quantum file management system 76 includes a quantum file manager 78, which operates to implement quantum files on the quantum computing system 10-1. The quantum file management system 76 also includes a quantum file registry 80 that includes metadata regarding each quantum file implemented in the quantum computing system 10-1, as discussed in greater detail below.

In this example, the quantum computing system 10-1 implements a quantum file 82 that, solely for purposes of illustration, is made up of only two (2) qubits: the qubit 22-1 that is hosted on the quantum computing system 10-1, and the qubit 22-2, also hosted on the quantum computing system 10-1. It is noted that the quantum file management system 76 implements quantum files having a larger number of qubits than two, such as ten qubits, 100 qubits, or thousands of qubits. It is also noted that in some implementations, the quantum file management system 76 is distributed over multiple different quantum computing systems, and thereby implements quantum files that comprise qubits that are implemented on multiple quantum computing systems.

The quantum computing system 10-1 includes a file system 84 that includes one or more quantum file references 86 (only one illustrated). Each of the quantum file references 86 corresponds to a quantum file that is maintained in the quantum file registry 80 and that is "owned" by the quantum computing system 10-1. In this example, the quantum file reference 86 corresponds to the quantum file 82.

In exemplary operation, a quantum file such as the quantum file 82 may be accessed by a requestor (e.g., a quantum service 88) via the quantum file reference 86, which is identified by the quantum service 88 via an identifier (not shown). The quantum service 88 provides the identifier to the quantum file manager 78 via any suitable inter-process communications mechanism, such as an application programming interface (API) or the like. In some examples, the quantum file manager 78 may be an integral part of a quantum operating system, and the appropriate intercommunication mechanisms between the quantum service 88 and the quantum file manager 78 may be generated in response to certain programming instructions, such as reading, writing, or otherwise accessing the quantum file 82 while the quantum service 88 is being compiled.

The quantum file manager 78 then accesses the file system 84. Based on the quantum file identifier provided by the quantum service 88, the quantum file manager 78 accesses the quantum file reference 86. The quantum file reference 86 includes information about the quantum file 82 such as an internal quantum file identifier for the quantum file 82, a location of a quantum assembly (QASM) file 20-1-20-4 that contains programming instructions that access the quantum file 82, and/or metadata for the quantum file 82 (e.g., a creation timestamp of the quantum file 82, a last modification timestamp of the quantum file 82, and/or a current user of the quantum file 82, as non-limiting examples). The quantum file reference 86 may also identify each qubit 22-1, 22-2 that makes up the quantum file 82.

In some examples, data may be spread over the qubits 22-1 and 22-2 of the quantum file 82 in a manner that dictates that the qubits 22-1 and 22-2 must be accessed in some sequential order for the data to have contextual meaning. Accordingly, some examples may provide that the order in which the qubits 22-1 and 22-2 are identified in the quantum file reference 86 may correspond to the appropriate order in which the qubits 22-1 and 22-2 should be accessed if the contextual meaning of the data is relevant. Some examples may also provide that the quantum file reference 86 includes qubit entanglement status fields that indicate entanglement status information about the qubits 22-1 and 22-2.

The quantum file manager 78, upon receiving an access request to a quantum file such as the quantum file 82, may access the quantum file registry 80 (using, e.g., a linking service (not shown)) to determine a current status of the quantum file 82. The quantum file registry 80 of FIG. 6 comprises a plurality of quantum file registry records 90 (only one illustrated), each of which corresponds to a quantum file implemented in the quantum computing system 10-1. In this example, the quantum file registry record 90 corresponds to the quantum file 82.

Each of the quantum file registry records 90 includes current metadata regarding the corresponding quantum files. The metadata may include, as non-limiting examples, an internal file identifier of the corresponding quantum file, an indicator of a number of qubits that make up the corresponding quantum file, and, for each qubit of the number of qubits, a qubit identification field and an entanglement status field. The quantum file registry record 90 may also include additional metadata, such as, by way of non-limiting example, a creation timestamp of the corresponding quantum file, a last modification timestamp of the corresponding quantum file, a current user (e.g., current quantum application or current quantum service) of the corresponding quantum file, and the like.

The quantum file manager 78 updates the quantum file reference 86 with the information from the quantum file registry record 90 and the outcome of any checks, such as entanglement checks performed by the entanglement checker 52, and also updates the timestamp field with the current time. If none of the qubits 22-1 and 22-2 are entangled, the quantum file manager 78 then returns control to the quantum service 88, passing the quantum service 88 at least some of the updated information contained in the quantum file reference 86. The quantum service 88 may then initiate actions against the qubits 22-1 and 22-2, such as read actions, write actions, or the like. The quantum file management system 76 allocates qubits to only one quantum file at a time.

The quantum computing system 10-1 includes a quantum file watch service 92 that operates to monitor the values of the qubits in a quantum file and, upon detecting that a value in a qubit in a quantum file has changed, to perform a quantum file change action. For purposes of illustrating the operation of the quantum file watch service 92 according to one implementation, assume that the quantum service 88 is initiated by executing the QASM file 20-1. At some point during execution, the quantum service 88 sends a request to the quantum file watch service 92 to be notified upon a change in value of the quantum file 82. The quantum file watch service 92 receives the request and interacts with the quantum file manager 78, providing the quantum file manager 78 the quantum file identifier provided by the quantum service 88.

The quantum file manager 78, as described above, accesses the quantum file registry 80 to determine a current status of the quantum file 82. The quantum file registry 80 updates the information maintained in the quantum file registry record 90, including a determination as to whether any of the qubits 22-1 and 22-2 are entangled. The quantum file manager 78 updates the quantum file reference 86 with the information from the quantum file registry record 90 and the outcome of any checks, such as entanglement checks performed by the entanglement checker 52, and also updates the timestamp field with the current time. If none of the qubits 22-1 and 22-2 are entangled, the quantum file manager 78 then returns control to the quantum file watch service 92, passing the quantum file watch service 92 at least some of the updated information contained in the quantum file reference 86.

The quantum file watch service 92 receives the information, which includes identifiers of the qubits 22-1 and 22-2. The quantum file watch service 92 generates a quantum file watch entry 94. The quantum file watch entry 94 includes a quantum file identifier field 96 that identifies the quantum file 82, a quantum service identifier field 98 that identifies the quantum service 88 (QS1) as having requested notification of a change in value of the quantum file 82. A quantum file change action field 100 indicates that the quantum file watch service 92 is to send the quantum service 88 a notification upon detecting that the value of the quantum file 82 has changed.

The quantum file watch service 92 then determines whether either of the qubits 22-1 and 22-2 are in superposition. In one implementation, this information may be maintained in the quantum file registry record 90 and the quantum file reference 86, and returned to the quantum file watch service 92 by the quantum file manager 78. In other implementations, the quantum file watch service 92 may access and parse the QASM file 20-1 to determine if the QASM file 20-1 contains instructions that place either of the qubits 22-1 and 22-2 in superposition. For purposes of illustration, it will be assumed that both the qubits 22-1 and 22-2 are in superposition.

The quantum file watch service 92 then determines an initial qubit value (IQV) 102 and 104 of the qubits 22-1 and 22-2, respectively. The quantum file watch service 92 may utilize, for example, the qubit value determination operation discussed above with regard to FIG. 3 to determine the IQVs 102 and 104. The quantum file watch service 92 may then, subsequently, initiate the qubit value determination operation to determine CQVs 106 and 108 of the qubits 22-1 and 22-2, respectively. The quantum file watch service 92 then compares the CQV 106 to the IQV 102, and the CQV 108 to the IQV 104. If the CQV 106 and the IQV 102 differ from one another, and/or the CQV 108 and the IQV 104 differ from one another, then the quantum file watch service 92 notifies the quantum service 88 such as by sending the quantum service 88 a message that the value of the quantum file 82 has changed.

If the CQV 106 and the IQV 102 are equal, and if the CQV 108 and the IQV 104 are equal, then the quantum file watch service 92 continuously initiates the qubit value determination operation to determine CQVs 106 and 108. This process may be repeated intermittently, aperiodically, or periodically at any suitable interval, such as, by way of non-limiting example, every 100 milliseconds, every 250 milliseconds, every 500 milliseconds, every second, every five seconds, or any other desirable interval.

In some implementations, the quantum service 88 may identify the quantum file 82, but request that the quantum file watch service 92 monitor only a subset of the qubits 22-1 and 22-2 that make up the quantum file 82.

Figure 7:
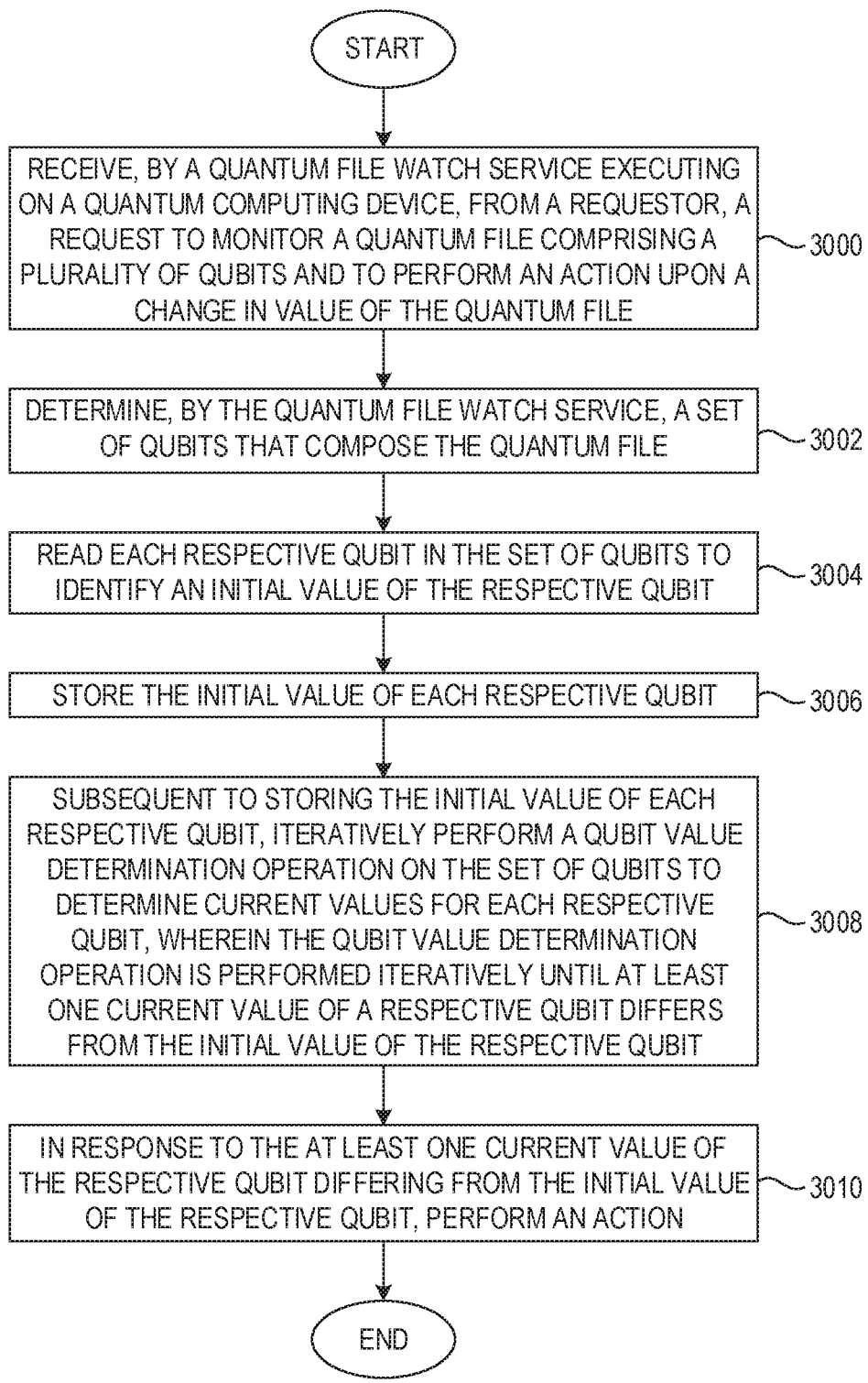
FIG. 7 is a flowchart of a method for implementing the quantum file watch service illustrated in FIG. 6, according to one implementation.

FIG. 7 is a flowchart of a method for implementing the quantum file watch service illustrated in FIG. 6, according to one implementation. FIG. 7 will be discussed in conjunction with FIG. 6. The quantum file watch service 92, receives, from a requestor such as the quantum service 88, a request to monitor the quantum file 82 composed of the plurality of qubits 22-1 and 22-2, and to perform an action upon a change in value of the quantum file 82 (FIG. 7, block 3000). The quantum file watch service 92 determines the set of qubits 22-1-22-2 that compose the quantum file 82 (FIG. 7, block 3002). The quantum file watch service 92 reads each respective qubit 22-1 and 22-2 to identify an initial value of the respective qubits 22-1 and 22-2 (FIG. 7, block 3004). The quantum file watch service 92 stores the initial value of each respective qubit 22-1 and 22-2 (FIG. 7, block 3006). The quantum file watch service 92, subsequent to storing the initial value of each respective qubit 22-1 and 22-2, iteratively performs the qubit value determination operation on the set of qubits 22-1 and 22-2 to determine current values for each respective qubit 22-1 and 22-2, wherein the qubit value determination operation is performed iteratively until at least one current value of a respective qubit 22-1 and 22-2 differs from the initial value of the respective qubit 22-1 and 22-2 (FIG. 7, block 3008). The quantum file watch service 92, in response to the at least one current value of the respective qubit 22-1 and 22-2 differing from the initial value of the respective qubit 22-1 and 22-2, performs an action (FIG. 7, block 3010).

Figure 8:
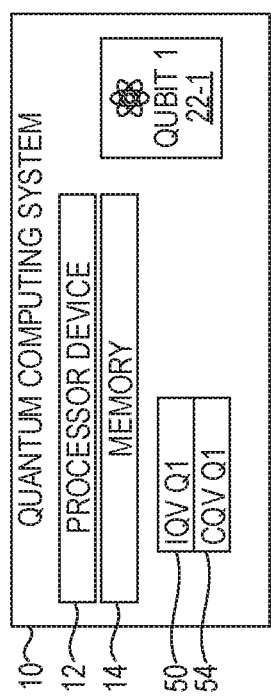
FIG. 8 is a simplified block diagram of the quantum computing system illustrated in FIG. 1, according to one example.

FIG. 8 is a simplified block diagram of the quantum computing system 10 illustrated in FIG. 1, according to one example. The quantum computing system 10 includes the memory 14 and the processor device 12 coupled to the memory 14. The processor device 12 is to determine, based on a plurality of readings of the qubit 22-1 that is in superposition, the IQV 50. Subsequent to determining the IQV 50, the processor device 12 is to determine, based on a second plurality of readings of the qubit 22-1, the CQV 54. The processor device 12 is to determine that the IQV 50 differs from CQV 54. Responsive to determining that the IQV 50 differs from CQV 54, the processor device 12 is to initiate a changed qubit action.

Figure 9:
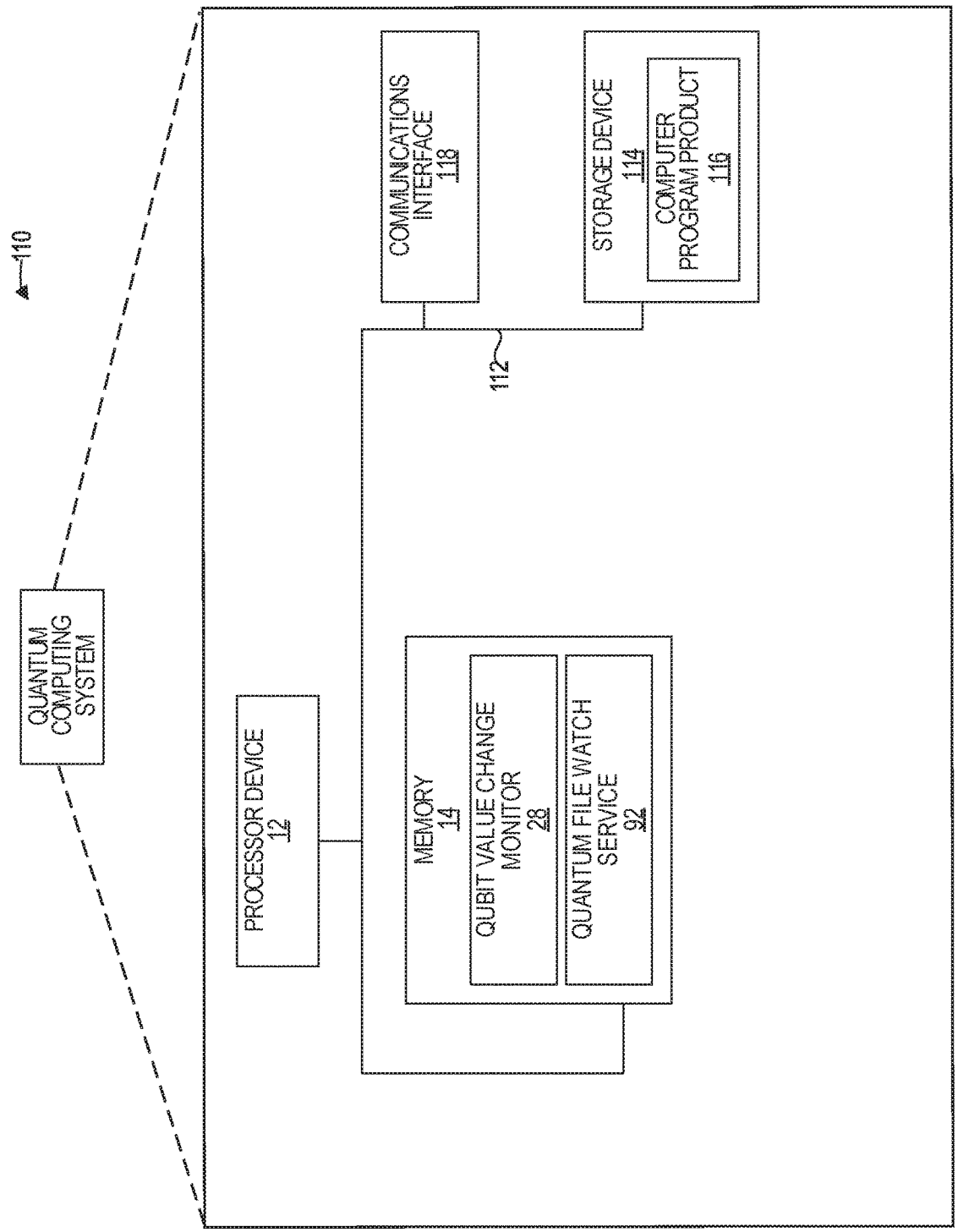
FIG. 9 is a block diagram of a quantum computing system suitable for implementing examples disclosed herein according to one example.

FIG. 9 is a block diagram of a quantum computing system 110 suitable for implementing the quantum computing systems 10 or 10-1 discussed above. The quantum computing system 110 may comprise any computing or electronic device capable of including firmware, hardware, and/or executing software instructions to implement the functionality described herein in a quantum environment. The quantum computing system 110 includes the one or more processor devices 12, the one or more memories 14 and a system bus 112. The system bus 112 provides an interface for system components including, but not limited to, the one or more memories 14 and the one or more processor devices 12. The processor devices 12 can be any commercially available or proprietary processor suitable for operating in a quantum environment. The quantum computing system 110 may further include or be coupled to a non-transitory computer-readable storage medium such as a storage device 114. The storage device 114 and other drives associated with computer-readable media and computer-usable media may provide non-volatile storage of data, data structures, computer-executable instructions, and the like.

A number of modules can be stored in the storage device 114 and in the memory 14, including the qubit value change monitor 28 and/or the quantum file watch service 92. All or a portion of the examples may be implemented as a computer program product 116 stored on a transitory or non-transitory computer-usable or computer-readable storage medium, such as the storage device 114, which includes complex programming instructions, such as complex computer-readable program code, to cause the one or more processor devices 12 to carry out the steps described herein. Thus, the computer-readable program code can comprise software instructions for implementing the functionality of the examples described herein when executed on the one or more processor devices 12.

An operator, such as the operator 46, may also be able to enter one or more configuration commands through a keyboard (not illustrated), a pointing device such as a mouse (not illustrated), or a touch-sensitive surface (not illustrated). The quantum computing system 110 may also include a communications interface 118 suitable for communicating with other computing devices, including, in some implementations, classical computing devices.

Other computer system designs and configurations may also be suitable to implement the systems and methods described herein. The following examples illustrate various additional implementations in accordance with one or more aspects of the disclosure.

Example 1 is a quantum computing system that includes a means for determining, based on a first plurality of readings of a first qubit that is in superposition, an initial first qubit value; a means for, subsequent to determining the initial first qubit value, determining, based on a second plurality of readings of the first qubit that is in superposition, a current first qubit value; a means for determining that the initial first qubit value differs from the current first qubit value; and a means for, responsive to determining that the initial first qubit value differs from the current first qubit value, initiating a changed qubit action.

Example 2 is a quantum computing system that includes an initial qubit value determiner to determine, based on a first plurality of readings of a first qubit that is in superposition, an initial first qubit value; a current qubit value determiner to, subsequent to determining the initial first qubit value, determine, based on a second plurality of readings of the first qubit that is in superposition, a current first qubit value; a difference determiner to determine that the initial first qubit value differs from the current first qubit value; and a qubit action initiator to, responsive to determining that the initial first qubit value differs from the current first qubit value, initiate a changed qubit action.

Example 3 is a computer program product stored on a non-transitory computer-readable storage medium and including instructions configured to cause a processor device to determine, based on a first plurality of readings of a first qubit that is in superposition, an initial first qubit value; subsequent to determining the initial first qubit value, determine, based on a second plurality of readings of the first qubit that is in superposition, a current first qubit value; determine that the initial first qubit value differs from the current first qubit value; and responsive to determining that the initial first qubit value differs from the current first qubit value, initiate a changed qubit action.

Example 4 is a quantum computing system that includes a memory and a processor device coupled to the memory to receive, from a quantum service, a request to monitor a qubit that is in superposition for a change in value; determine that the qubit is not entangled; determine an initial first qubit value of the qubit; subsequent to determining the initial first qubit value, determine, based on a plurality of readings of the first qubit that is in superposition, a current first qubit value; determine that the initial first qubit value differs from the current first qubit value; and responsive to determining that the initial first qubit value differs from the current first qubit value, initiate a changed qubit action.

Example 5 is a method that includes receiving, by a quantum file watcher executing on a quantum computing device, from a requestor, a request to monitor a quantum file including a plurality of qubits and to perform an action upon a change in value of the quantum file; determining, by the quantum file watcher, a set of qubits that compose the quantum file; reading each respective qubit in the set of qubits to identify an initial value of the respective qubit; storing the initial value of each respective qubit; subsequent to storing the initial value of each respective qubit, iteratively performing a qubit value determination operation on the set of qubits to determine current values for each respective qubit, wherein the qubit value determination operation is performed iteratively until at least one current value of a respective qubit differs from the initial value of the respective qubit; and in response to the at least one current value of the respective qubit differing from the initial value of the respective qubit, performing an action.

Example 6 is the method of example 5 further including determining, by the quantum file watcher, that at least one qubit of the plurality of qubits is in superposition; for each respective qubit of the at least one qubit in superposition, determining the initial value by: determining, for each of a plurality of iterations, a value of the respective qubit to generate a set of values; and determining, based on the set of values, the initial value.

Example 7 is the method of example 5 wherein determining, by the quantum file watcher, the set of qubits that compose the quantum file includes accessing a quantum file registry that identifies a plurality of quantum files, and for each respective quantum file of the plurality of quantum files, a plurality of qubits that compose the respective quantum file.

Example 8 is the method of example 5 wherein the qubit value determination operation is iteratively performed periodically, and wherein the periodic interval is in a range between about 0.5 seconds and 1.5 seconds.

Example 9 is the method of example 5 wherein performing the qubit value determination operation on the set of qubits includes, for each respective qubit in the set of qubits that is not in superposition, reading the respective qubit to determine the respective current value; and for each respective qubit in the set of qubits that is in superposition, determining, for each of a first plurality of iterations, a value of the respective qubit to generate a set of values; and determining, based on the set of values, the respective current value.

Example 10 is the method of example 9 wherein the first plurality of iterations includes a predetermined number of iterations.

Example 11 is the method of example 9 wherein the first plurality of iterations includes a number of iterations sufficient to meet a predetermined condition, and wherein the predetermined condition includes a condition wherein a predetermined percentage of the values in the set of values are a same value.

Example 12 is the method of example 9 wherein the first plurality of iterations includes a number of iterations sufficient to meet a predetermined condition, and wherein the predetermined condition includes a condition wherein a predetermined percentage of the values in the set of values are a same value and at least a minimum number of iterations have been performed.

Example 13 is the method of example 5 further including generating, based on the initial value of each respective qubit and the current value of each respective qubit, a difference value identifying a difference between the initial value of each respective qubit and the current value of each respective qubit.

Example 14 is the method of example 5 wherein the request was received from a requestor, and wherein performing the action includes sending a notification that the quantum file has changed to the requestor.

Example 15 is the method of example 5 wherein performing the action includes accessing a quantum file watch structure; accessing an entry of the quantum file watch structure corresponding to the quantum file; and sending a notification that the quantum file has changed to a destination identified in the entry.

Example 16 is the method of example 15, wherein the plurality of qubits includes at least 10 qubits, and wherein at least three qubits are in superposition.

Example 17 is a quantum computing system that includes a memory; and a processor device coupled to the memory to receive, from a requestor, a request to monitor a quantum file including a plurality of qubits and to perform an action upon a change in value of the quantum file; determine a set of qubits that compose the quantum file; read each respective qubit in the set of qubits to identify an initial value of the respective qubit; store the initial value of each respective qubit; subsequent to storing the initial value of each respective qubit, iteratively perform a qubit value determination operation on the set of qubits to determine current values for each respective qubit, wherein the qubit value determination operation is performed iteratively until at least one current value of a respective qubit differs from the initial value of the respective qubit; and in response to the at least one current value of the respective qubit differing from the initial value of the respective qubit, perform an action.

Individuals will recognize improvements and modifications to the preferred examples of the disclosure. All such improvements and modifications are considered within the scope of the concepts disclosed herein and the claims that follow.

What is claimed is:

1. A method comprising:
   determining, based on a first plurality of readings of a first qubit that is in superposition, an initial first qubit value;
   subsequent to determining the initial first qubit value, determining, based on a second plurality of readings of the first qubit that is in superposition, a current first qubit value;
   determining that the initial first qubit value differs from the current first qubit value; and
   responsive to determining that the initial first qubit value differs from the current first qubit value, initiating a changed qubit action.

2. The method of claim 1 wherein determining, based on the first plurality of readings of the first qubit, the initial first qubit value comprises:
   reading, for each of a plurality of iterations, the first qubit to generate a set of values of the first qubit; and
   determining, based on the set of values, the initial first qubit value.

3. The method of claim 2 wherein the values in the set of values of the first qubit are not all a same value, and wherein reading, for each of the plurality of iterations, the first qubit to generate the set of values comprises reading, for each of the plurality of iterations, a value of the first qubit to generate the set of values until a predetermined condition is met.

4. The method of claim 3 wherein the predetermined condition comprises a predetermined number of iterations, and wherein determining, based on the set of values, the initial first qubit value comprises determining the initial first qubit value based on a mathematical mode of the values in the set of values.

5. The method of claim 3 wherein the predetermined condition comprises a condition wherein a predetermined percentage of the values in the set of values are a same value.

6. The method of claim 3 wherein the predetermined condition comprises a condition wherein a predetermined percentage of the values in the set of values are a same value and at least a minimum number of iterations has been performed.

7. The method of claim 1 further comprising:
   receiving, from a first quantum service, a request to be notified upon a change in value of the first qubit; and
   wherein initiating the changed qubit action comprises sending a notification to the first quantum service that the value of the first qubit has changed.

8. The method of claim 1 further comprising:
   receiving, from a first quantum service, a request to be notified upon a change in value of the first qubit;
   in response to receiving the request, determining, based on the first plurality of readings of the first qubit, the initial first qubit value; and
   wherein initiating the changed qubit action comprises sending a notification to the first quantum service that the change in value of the first qubit has occurred.

9. The method of claim 1 wherein the first plurality of readings is performed within a one millisecond timeframe.

10. The method of claim 9 wherein the first plurality of readings exceeds one hundred readings.

11. The method of claim 1 further comprising:
    receiving a request to be notified upon a change in value of the first qubit;
    in response to receiving the request, determining that the first qubit is in superposition; and
    in response to determining that the first qubit is in superposition, determining, based on the first plurality of readings of the first qubit, the initial first qubit value.

12. The method of claim 11 wherein determining that the first qubit is in superposition comprises:
    accessing a quantum assembly (QASM) file that contains executable instructions;
    analyzing the QASM file in accordance with a syntax of a programming language;
    identifying an operation in the QASM file that puts the first qubit in superposition; and
    in response to identifying the operation in the QASM file that puts the first qubit in superposition, determining that the first qubit is in superposition.

13. The method of claim 1 further comprising:
    prior to determining the initial first qubit value, determining that the first qubit is not entangled with another qubit; and
    in response to determining that the first qubit is not entangled with another qubit, determining, based on the first plurality of readings of the first qubit that is in superposition, the initial first qubit value.

14. A method comprising:
    determining, for each of a first plurality of iterations, a value of a first qubit in superposition to generate a set of values;
    determining, based on the set of values, an initial first qubit value;
    subsequent to determining the initial first qubit value, determining, for each of a second plurality of iterations, the value of the first qubit in superposition to generate a second set of values;
    determining, based on the second set of values, a current first qubit value;
    determining that the initial first qubit value differs from the current first qubit value; and
    responsive to determining that the initial first qubit value differs from the current first qubit value, initiating a changed qubit action.

15. A quantum computing system, comprising:
    a memory; and
    a processor device coupled to the memory to:
       determine an initial first qubit value of a first qubit that is in superposition;
       subsequent to determining the initial first qubit value, determine, based on a plurality of readings of the first qubit that is in superposition, a current first qubit value;
       determine that the initial first qubit value differs from the current first qubit value; and
       responsive to determining that the initial first qubit value differs from the current first qubit value, initiate a changed qubit action.

16. The quantum computing system of claim 15 wherein to determine, based on the plurality of readings of the first qubit, the current first qubit value, the processor device is further to:
    read, for each of a plurality of iterations, the first qubit to generate a set of values of the first qubit; and
    determine, based on the set of values, the current first qubit value.

17. The quantum computing system of claim 16 wherein the values in the set of values of the first qubit are not all a same value, and wherein reading, for each of the plurality of iterations, the first qubit to generate the set of values, the processor device is further to read, for each of the plurality of iterations, a value of the first qubit to generate the set of values until a predetermined condition is met.

18. The quantum computing system of claim 17 wherein the predetermined condition comprises a condition wherein a predetermined percentage of the values in the set of values are a same value and at least a minimum number of iterations has been performed.

19. The quantum computing system of claim 15 wherein the processor device is further to:
   receive a request to be notified upon a change in value of the first qubit;
   in response to receiving the request, determine that the first qubit is in superposition; and
   in response to determining that the first qubit is in superposition, determine, based on a first plurality of readings of the first qubit that is in superposition, the initial first qubit value.

20. The quantum computing system of claim 19 wherein to determine that the first qubit is in superposition, the processor device is further to:
   access a quantum assembly (QASM) file that contains executable instructions;
   analyze the QASM file in accordance with a syntax of a programming language;
   identify an operation in the QASM file that puts the first qubit in superposition; and
   in response to identifying the operation in the QASM file that puts the first qubit in superposition, determine that the first qubit is in superposition.

\* \* \* \* \*